(12) United States Patent  
Marty et al.

(10) Patent No.: US 9,279,684 B2  
(45) Date of Patent: Mar. 8, 2016

(54) AIR DATA PROBE SENSE PORT REPAIR

(71) Applicant: Rosemount Aerospace Inc., Burnsville, MN (US)

(72) Inventors: Eric Marty, Savage, MN (US); David J. Koch, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 372 days.

(21) Appl. No.: 13/855,548

(22) Filed: Apr. 2, 2013

(65) Prior Publication Data

US 2014/0290354 A1 Oct. 2, 2014

(51) Int. Cl.
*G01C 21/00* (2006.01)
*G01C 25/00* (2006.01)
*B64F 5/00* (2006.01)
*G01P 5/14* (2006.01)
*G01P 5/165* (2006.01)

(52) U.S. Cl.
CPC .............. *G01C 21/00* (2013.01); *B64F 5/0081* (2013.01); *G01C 25/00* (2013.01); *G01P 5/14* (2013.01); *G01P 5/165* (2013.01); *Y10T 29/49732* (2015.01)

(58) Field of Classification Search
None
See application file for complete search history.

(56) References Cited

U.S. PATENT DOCUMENTS

| | | | | |
|---|---|---|---|---|
| 3,400,583 A | * | 9/1968 | Newport et al. | 73/182 |
| 3,494,820 A | * | 2/1970 | Shewmake | B29C 73/10 |
| | | | | 156/293 |
| 4,905,709 A | * | 3/1990 | Bieganski et al. | 600/538 |
| 5,190,611 A | * | 3/1993 | Cologna et al. | 156/98 |
| 2002/0157229 A1 | | 10/2002 | Feeley et al. | |
| 2004/0182132 A1 | * | 9/2004 | Head | 73/23.2 |

FOREIGN PATENT DOCUMENTS

WO   WO-2007133198 A1   11/2007

OTHER PUBLICATIONS

European Search Report dated Jul. 1, 2014 issued in European Application No. EP 14163251.3.

* cited by examiner

*Primary Examiner* — Peter Macchiarolo
*Assistant Examiner* — Jermaine Jenkins
(74) *Attorney, Agent, or Firm* — Locke Lord LLP; Scott D. Wofsy; Joshua L. Jones

(57) ABSTRACT

A method of repairing an air data probe sense port includes inserting a plug into a sense port in an air data probe, mounting the plug to the air data probe, dressing the welded plug to be substantially flush with adjacent air data probe surface, and forming a new sense port in the air data probe. The method can include enlarging the sense port prior to inserting the plug therein.

17 Claims, 3 Drawing Sheets

AIR DATA PROBE SENSE PORT REPAIR

BACKGROUND OF THE INVENTION

1. Field of the Invention

The present invention relates to air data probes and more particularly to air data probes for aerospace applications.

2. Description of Related Art

A variety of air data probe devices are known in the art for aircraft flight control. Of such devices, many are directed to measuring Pitot pressure, static pressure, local angle of attack pressures, and angle of sideslip pressures as parameters for calculating pressure altitude, altitude rate, airspeed, Mach number, angle of attack, and angle of sideslip. The air data probe typically includes one or more static pressure ports located on the side of the probe head integral to the probe's surface which sense the atmospheric pressure outside of the aircraft. When these static pressure ports take consistent pressure measurements, they can provide accurate and consistent calculations of the above mentioned parameters.

In ordinary use, exposure to the elements can eventually cause corrosion of the sensor ports. Damage to drain ports can occur during normal use. Additionally, sensor ports can be damaged during handling, such as during a pre-flight check. Such corrosion and deformation can alter the geometry of the sensor ports. This can reduce accuracy, and if the reduction in accuracy is substantial enough the probe must be replaced in order to resume accurate and consistent calculations parameters like those listed above.

Such conventional methods and systems have generally been considered satisfactory for their intended purpose. However, there is still a need in the art for repair of damaged sensor ports that allows for restoration of proper function. There also remains a need in the art for such repairs that are easy to make and use. The present invention provides a solution for these problems.

SUMMARY OF THE INVENTION

The subject invention is directed to a new and useful method of repairing an air data probe sense port. The method includes inserting a plug into a sense port in an air data probe, forming a joint joining the plug to the air data probe, dressing the joint to be substantially flush with adjacent air data probe surface, and forming a new sense port in the air data probe.

In certain embodiments, the method includes enlarging the sense port prior to inserting the plug therein. Inserting a plug can include inserting a cylindrical plug with an enlarged portion. The enlarged portion of the plug can remain outside the sense port and can prevent over insertion of the plug. Forming a new sense port can include forming the new sense port in substantially the same position as the plug. For example, the new sense port can be formed through the center of the plug. The method can include locating the position for the new sense port based on at least one other port location in the air data probe. It is also contemplated that the method can include removing corrosion from an area adjacent to the sense port.

In another aspect, forming a joint joining the plug to the air data probe can include welding the plug to the air data probe. The plug can be of the same material as the air data probe and the welding can be autogenous welding. It is also contemplated that forming a joint joining the plug to the air data probe can include brazing or any other suitable joining technique.

The invention also provides an air data probe. The air data probe includes a probe body having a sense port defined through a wall of the probe body. The sense port is located in a heat affected zone of the wall of the probe body, and/or proximate a plug mounted to the wall of the probe body by an autogenous weld joint.

The sense port can be proximate, surrounded at least in part, and/or concentric with a plug mounted in the wall of the probe body. It is also contemplated that the probe body can define a longitudinal axis and the sense port can be located in substantially the same axial position along the longitudinal axis as a plug mounted into the wall of the probe body. The sense port can be of any suitable type such as an angle of attack port, a static port, an angle of sideslip port, and a drain port.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
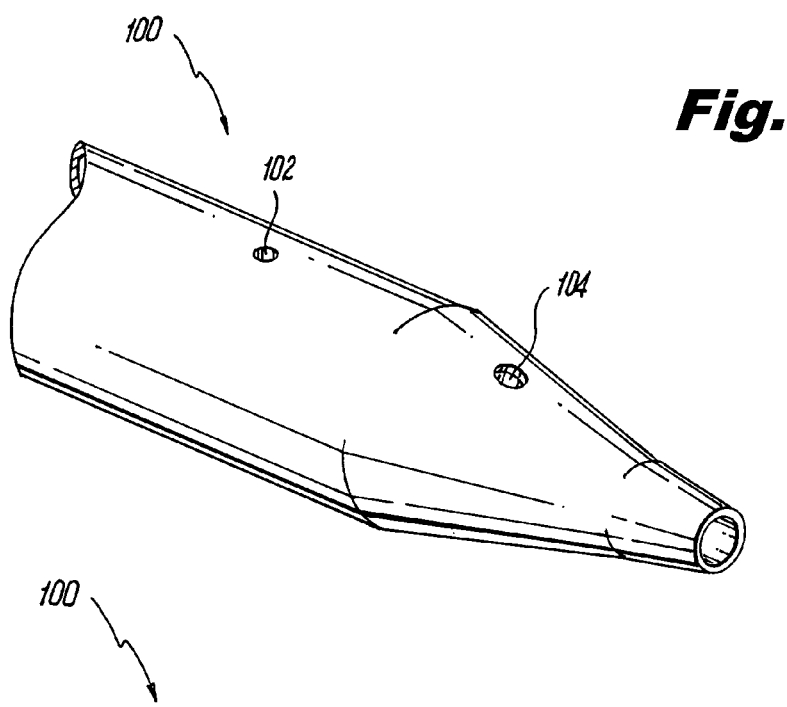
FIG. 1 is a perspective view of a portion of an exemplary embodiment of an air data probe constructed in accordance with the present invention, showing a step of repair associated with enlargement of a damaged or corroded sense port.

Reference will now be made to the drawings wherein like reference numerals identify similar structural features or aspects of the subject invention. For purposes of explanation and illustration, and not limitation, a partial view of an exemplary embodiment of air data probe repair in accordance with the invention is shown in FIG. 1 and is designated generally by reference character 100. Other embodiments of air data probe repair in accordance with the invention, or aspects thereof, are provided in FIGS. 2-6, as will be described. The methods and systems of the invention can be used for repair of air data probes with corroded or otherwise damaged sense ports, to improve or restore probe functional performance.

With reference to FIG. 1, air data probe 100 includes a static port 102 and an angle of attack sense port 104. After use resulting in corrosion to the material surrounding sense port 104, or handling causing damage to sense port 104, or any other damage to sense port 104, the sense port 104 is enlarged to remove the damaged and/or corroded material. As shown in FIG. 1, sense port 104 is oversized compared to its original size because the enlargement is complete as shown in FIG. 1. The enlargement can be performed by drilling, milling, or any other suitable process, and the enlarged port can optionally be chamfered to help with joint penetration later in the process, which is described below. Prior to inserting plug 106, described below, corrosion can be removed from the area surrounding sense port 104 as needed. It should be noted that while enlarged sense port 104 is shown as being larger that static port 102 in FIG. 1, the size of the ports before and after repair can be of the same or different sizes as needed for a specific application.

Figure 2:
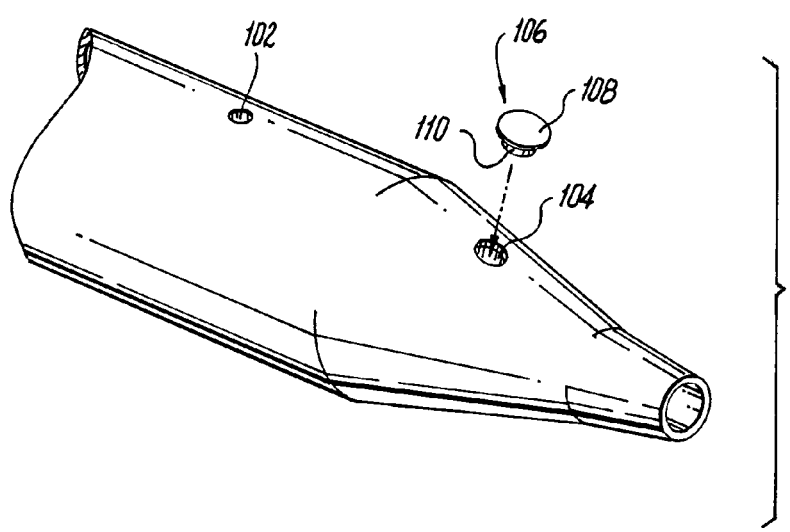
FIG. 2 is an exploded perspective view of the air data probe of FIG. 1, showing a stage of repair associated with insertion of a plug into the enlarged sense port.

Referring now to FIG. 2, the method includes inserting a plug 106 into the enlarged sense port 104. Plug 106 includes an enlarged head 108 and an insert portion 110. When insert portion 110 is inserted in enlarged sense port 104, enlarged head 108 prevents over insertion of plug 106. Plug 106 can be of the same material as the air data probe, for example to allow autogenous welding as described below, or of any other suitable material. For example, if the probe body of air data probe 100 is of NI200 ASTM B160, plug 106 can be made of the same material.

Figure 3:
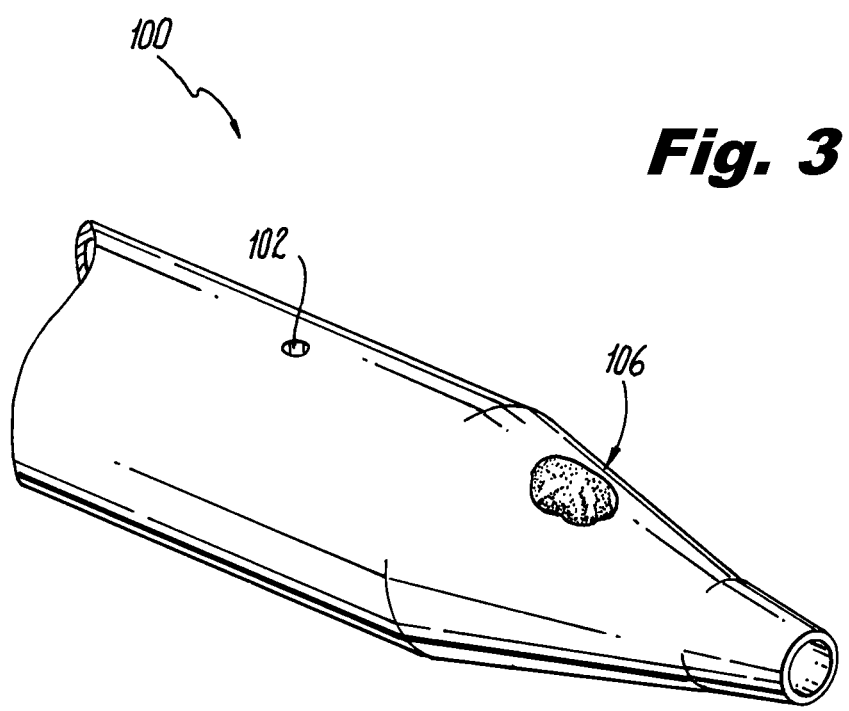
FIG. 3 is a perspective view of the air data probe of FIG. 1, showing a repair stage with the plug welded to the air data probe.

With reference to FIG. 3, with plug 106 in place a joint can be formed, joining plug 106 to air data probe 100. In the exemplary joint shown in FIG. 3, plug 106 is autogenously welded to air data probe 100, for example by GTAW (gas tungsten arc welding). This is facilitated by dimensioning plug 106 and enlarged sense port 104 to have a clearance of around 0.002 inches (50.8 µm), for example. Those skilled in the art will readily appreciate that welding is exemplary only. Plug 106 can be joined to air data probe 100 using any other suitable type of welding, brazing, or any other suitable process without departing from the scope of this disclosure. If suitable for a given application, the materials of plug 106 and air data probe 100 can be mismatched, in which case they can be joined by a suitable brazing process or the like. Plug 106 prevents welding material from penetrating too far into air data probe 100, which could have deleterious effects on probe function. While plug 106 includes an enlarged head 108 and insert portion 110, which form a t-shaped cross-section, this is exemplary only. Any other suitable cross-section can be used, for example frustoconical, without departing from the scope of this disclosure. The enlargement of sense port 104 can be contoured to match the plug geometry, for example if a frustoconical plug is used, the sense port 104 can be formed to match.

Figure 4:
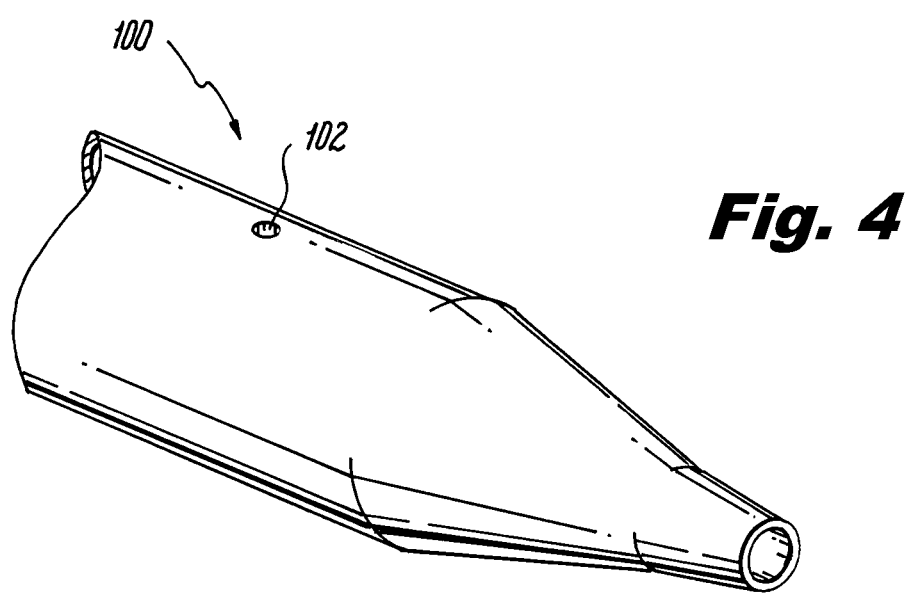
FIG. 4 is a perspective view of the air data probe of FIG. 1, showing a repair stage after the weld is formed and dressed flush with the surrounding surface of the air data probe.
Figure 5:
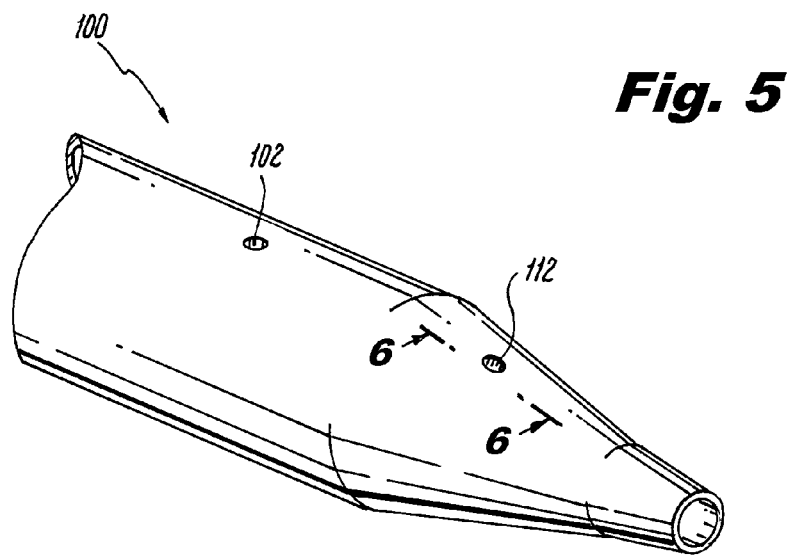
FIG. 5 is a perspective view of the air data probe of FIG. 1, showing a new port positioned in substantially the same position as the original damaged or corroded sense port.

Now referring to FIG. 4, the weld joint is shown after dressing the joint to be flush with adjacent air data probe surface. This can be done using grinding, or any other suitable process. At this stage, the air data probe 100 is effectively restored to its condition before sense port 104 was ever formed. In order to complete the repair, as shown in FIG. 5, a new sense port 112 is formed in the air data probe in substantially the same position where original sense port 104 was located. For example, new sense port 112 can be formed through the center of the plug, or near the center. The position for forming sense port 112 can be determined based on at least one other port location in the air data probe 100, e.g., using static port 102. New sense port 112 can be formed by drilling, milling, or any other suitable process. After new sense port 112 is formed, air data probe 100 can be degreased, flushed, and/or tested for suitability to return to service as needed.

Figure 6:
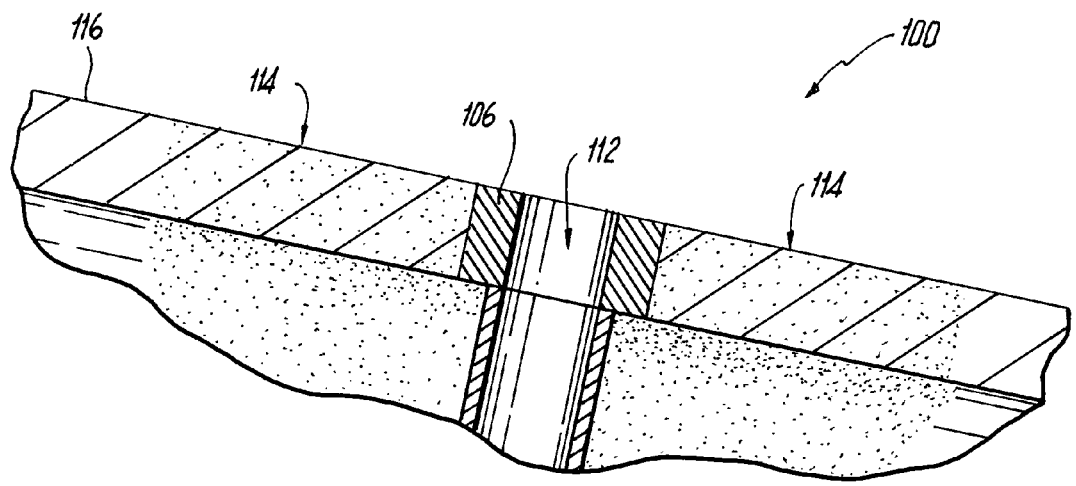
FIG. 6 is a cross-sectional side elevation view of a portion of the air data probe of FIG. 1, showing the new sense port formed through the heat affected zone, and within the plug.

Referring now to FIG. 6, the structure of repaired air date probe 100 can be verified by radiographic inspection for weld joint penetration and discontinuities. If suitable, repaired air data probe can be tested for performance in wind tunnels. As indicated by the stippling in FIG. 6, new sense port 112 is located in a heat affected zone 114 of the wall 116 of the probe body of air data probe 100. In the exemplary embodiment shown in FIG. 6, new sense port 112 is formed concentrically down the center of plug 106. Those skilled in the art will readily recognize that there are other suitable locations partially or completely outside plug 106 where a new sense port can be formed. For example, if multiple sense ports are being repaired, they can be formed on 90° or 180° offsets circumferentially (or any other suitable angle) from the plugs in the original sense ports in the same or different axial locations relative to the longitudinal axis of the probe body without departing from the scope of this disclosure. In some instances, it may be possible to repair a sense port without enlarging the original port. Instead, for example, a plug sized for the original sense port could be inserted, joined, and then completely drilled out to restore the proper geometry. The final structure, for example as shown in FIG. 6, can be verified by radiographic or metallurgical techniques, or by any other suitable means.

While shown and described above in the exemplary context of repairing an angle of attack sense port, those skilled in the art will readily appreciate that any other suitable type of port can be repaired in accordance with the invention. For example, the sense port repaired can be a type selected from the group consisting of an angle of attack port, a static port, an angle of sideslip port, and a drain port.

The methods and systems of the present invention, as described above and shown in the drawings, provide for air data probe repair with superior properties including repair of sense ports that are corroded or otherwise damaged. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A method of repairing an air data probe sense port comprising:
    inserting a plug into a sense port in an air data probe, wherein inserting a plug includes inserting a cylindrical plug with an enlarged portion, wherein the enlarged portion remains outside the sense port and prevents over insertion of the plug;
    forming a joint joining the plug to the air data probe;
    dressing the joint to be flush with adjacent air data probe surface; and
    forming a new sense port in the air data probe.

2. A method as recited in claim 1, further comprising enlarging the sense port prior to inserting the plug therein.

3. A method as recited in claim 1, wherein forming a new sense port includes forming the new sense port in the same position as the plug.

4. A method as recited in claim 1, further comprising locating where to form the new sense port based on at least one other port location in the air data probe.

5. A method as recited in claim 1, further comprising removing corrosion from an area adjacent to the sense port.

6. A method as recited in claim 1, wherein forming a joint joining the plug to the air data probe includes welding the plug to the air data probe.

7. A method as recited in claim 6, wherein welding the plug includes autogenously welding the plug to the air data probe.

8. A method as recited in claim 1, wherein forming a joint joining the plug to the air data probe includes brazing the plug to the air data probe.

9. A method as recited in claim 1, wherein the sense port is of a type selected from the group consisting of an angle of attack port, a static port, an angle of sideslip port, and a drain port.

10. A method as recited in claim 1, wherein inserting a plug includes inserting a plug of a common material with the air data probe.

11. An air data probe comprising:
a probe body including a sense port defined through a wall of the probe body, wherein the sense port is formed in the probe body by the method recited in claim 1.

12. An air data probe as recited in claim 11, wherein the sense port is surrounded at least in part with the plug mounted in the wall of the probe body.

13. An air data probe as recited in claim 11, wherein the sense port is proximate the plug welded to the wall of the probe body.

14. An air data probe as recited in claim 11, wherein the sense port is located concentric with the plug welded into the wall of the probe body.

15. An air data probe as recited in claim 11, wherein the probe body defines a longitudinal axis and the sense port is located in the same axial position along the longitudinal axis as the plug mounted into the wall of the probe body.

16. An air data probe as recited in claim 11, wherein the sense port is a type selected from the group consisting of an angle of attack port, a static port, an angle of sideslip port, and a drain port.

17. An air data probe as recited in claim 11, wherein the sense port is located in the same axial position along a longitudinal axis defined by the probe body as the plug mounted to the wall of the probe body by an autogenous weld joint.

\* \* \* \* \*